(12) United States Patent
Engesser

(10) Patent No.: US 8,813,470 B2
(45) Date of Patent: Aug. 26, 2014

(54) METHOD FOR OPERATING A FUEL SUPPLY FOR A HEAT ENGINE

(75) Inventor: Hermann Engesser, Baden-Rüttihof (CH)

(73) Assignee: Alstom Technology Ltd., Baden (CH)

( * ) Notice: Subject to any disclaimer, the term of this patent is extended or adjusted under 35 U.S.C. 154(b) by 135 days.

(21) Appl. No.: 13/524,102

(22) Filed: Jun. 15, 2012

(65) Prior Publication Data

US 2013/0055715 A1   Mar. 7, 2013

(30) Foreign Application Priority Data

Jun. 17, 2011   (CH) ........................................ 1029/11

(51) Int. Cl.
*F02G 3/00*    (2006.01)
*F02C 1/00*    (2006.01)
*F02C 7/232*   (2006.01)
*F02C 9/36*    (2006.01)

(52) U.S. Cl.
CPC . *F02C 7/232* (2013.01); *F02C 9/36* (2013.01); F05D 2260/602 (2013.01)
USPC .......................................... 60/39.094; 60/734

(58) Field of Classification Search
CPC .............. F02C 7/22; F02C 7/232; F02C 9/26
USPC .............. 60/633, 772, 39.091, 39.094, 39.12, 60/39.465, 722, 734, 39.141, 39.281; 244/135 R; 431/6, 15, 16, 22
See application file for complete search history.

(56) References Cited

U.S. PATENT DOCUMENTS

| 4,984,424 | A | * | 1/1991 | Shekleton | 60/39.094 |
| 5,621,164 | A | * | 4/1997 | Woodbury et al. | 73/40.5 R |
| 5,827,950 | A | * | 10/1998 | Woodbury et al. | 73/40.5 R |
| 6,449,955 | B2 | * | 9/2002 | Tanaka et al. | 60/776 |
| 2002/0088236 | A1 | * | 7/2002 | Arar et al. | 60/781 |

(Continued)

FOREIGN PATENT DOCUMENTS

| DE | 1162636 | | 2/1964 |
| DE | 2238727 | | 2/1973 |
| DE | 19501754 | A1 * | 9/1996 |
| EP | 0915240 | | 5/1999 |

OTHER PUBLICATIONS

Search Report for Swiss Patent App. No. 01029/11 (Sep. 23, 2011).

*Primary Examiner* — Thomas Denion
*Assistant Examiner* — Laert Dounis
(74) *Attorney, Agent, or Firm* — Buchanan Ingersoll & Rooney PC

(57) ABSTRACT

In a method for operating a fuel supply for a heat engine, in a first step the block valve (4) and the control valve (5) are closed, with the vent valve (7) closed. In a second step, the vent valve (7) is opened so that fuel volume (V1) which is present in the fuel line section (1') and vent line (6') can drain. In a third step, the vent valve (7) is closed. In a fourth step, the control valve (5) is opened. In a fifth step, the fuel volume (V1) is replenished by a pressure-driven backflow of fuel from the combustion process (3). In a sixth step, the control valve (5) is closed and then the vent valve (7) is opened, for draining of the replenished fuel volume (V1) which has been formed there on account of the action taken according to the fifth step.

7 Claims, 1 Drawing Sheet

(56) References Cited

U.S. PATENT DOCUMENTS

2008/0115483 A1  5/2008  Moore et al.
2011/0277480 A1* 11/2011  Aboujaib et al. ............... 60/734
2014/0123651 A1*  5/2014  Smith ............................ 60/737

* cited by examiner

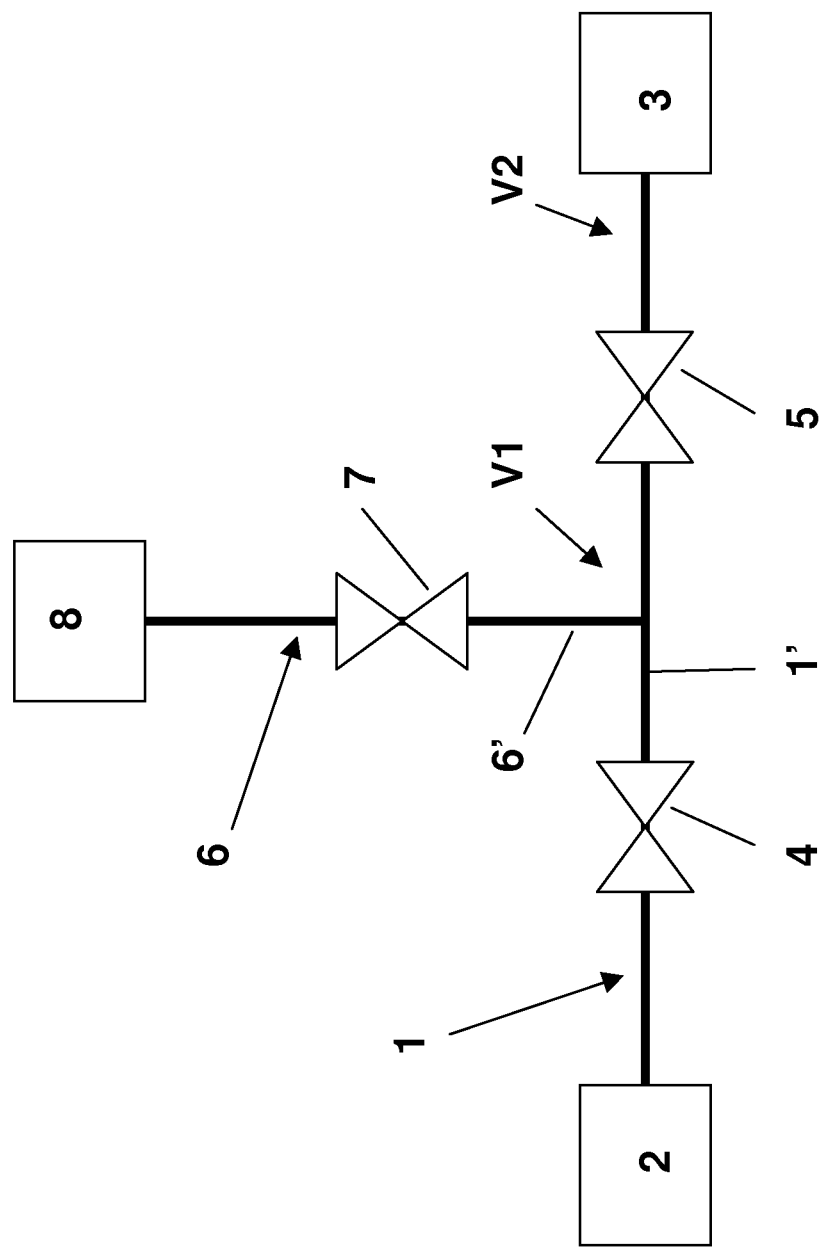

METHOD FOR OPERATING A FUEL SUPPLY FOR A HEAT ENGINE

This application claims priority under 35 U.S.C. §119 to Swiss App. No. 01029/11, filed 17 Jun. 2011, the entirety of which is incorporated by reference herein.

BACKGROUND

1. Field of Endeavor

The invention relates to a method for operating a fuel supply for a heat engine.

2. Brief Description of the Related Art

Heat engines, with gas turbine plants and/or steam turbine plants being first and foremost, which are used in most cases for power generation, are subject to strict safety guidelines which are outlined in normative regulations. In this context, reference may be made to the operating standard of the ISO Standard, ISO 21789, in which requirements for the safety of gas turbine plants, which are operated with liquid or gaseous fuel, are laid down. Of particular relevance are the specific requirements in Chapter 5.10 of the previously referred to ISO Standard for an operationally reliable fuel supply for the operation of a burner arrangement, under high working pressure, in which highly compressed combustion air and liquid and/or gaseous fuel are caused to be mixed to form an ignitable fuel-air mixture. In modern gas turbine plants, working pressures of more than 30 bar occur within the combustion process, which necessitate special provisions for a reliable fuel feed into the combustion process. Particularly in cases in which the fuel feed has to be interrupted in the short term, or a changeover from one type of fuel to the other (liquid to gaseous, or vice versa) is carried out, it is necessary to ensure that no uncontrolled flashbacks along the fuel feed line or other uncontrolled fuel explosions take place. For avoiding such irregular combustion phenomena, provision is made along the fuel feed line for a specially designed safety valve system—a so-called double block and vent valve system—which ensures a safe interruption of the fuel both in cases of a controlled shutdown of the gas turbine plant and in emergency cases. The construction and the mode of operation of such a double block and vent valve is described in detail in Chapter 5.10.5 in the previously cited ISO Standard, ISO 21789.

In the previously current practice for executing a rapid shutdown of the combustion process 3, the feed of fuel is prevented as a result of simultaneous closing of a block valve and control valve, as a result of which a proportion of the fuel, under working pressure conditions of the combustion process, is trapped inside a line section of the fuel line and vent line, which section is delimited on one side by the block valve, control valve and vent valve which are closed in each case. Furthermore, it may be assumed that this line section traps a fuel volume of V1.

After closing of the block valve and control valve has taken place, the vent valve is opened, as a result of which the proportion of pressurized fuel is drained via the vent valve into the region of the drainage point. If the fuel is a gaseous fuel, for example, then this can escape via a type of chimney at a safe place into the open atmosphere.

In this way, a safe disposal of the proportion of fuel inside the line section which delimits the fuel volume V1 is certainly ensured, but a substantial additional volumetric proportion V2 of fuel remains in the fuel line which extends downstream of the control valve and upstream of the combustion process. This proportion of residual fuel can lead to unwanted ignition or combustion reactions which, especially in the case of fuel flashbacks along the fuel line, can lead to significant damage. It is now necessary to reliably exclude these uncontrolled combustion events. The current measures for avoiding such uncontrolled combustion events provide purging of the fuel line which leads to the combustion process, during which, with the control valve open, purging media, such as $CO_2$, $N_2$, air or the like, is fed via additional purging lines into the fuel line which leads to the combustion process. However, such purging measures can contribute or lead to further malfunctions of the combustion process, as a result of which at least the proportion of residual fuel in the region of the burner arrangement is caused to combust.

SUMMARY

One of numerous aspects of the invention can provide a remedy here. Another aspect of the invention includes a method for operating a fuel supply for a heat engine, in which flashback from the combustion process into the fuel-carrying lines is prevented.

Another aspect includes a fuel supply for a heat engine, which basically comprises at least one fuel line, which leads to a combustion process and along which at least one valve group is arranged. Each valve group comprises at least one block valve and at least one control valve, wherein the control valve is arranged close to the combustion process. The two valves delimit a fuel line section, wherein a vent line, equipped with at least one vent valve, branches from this fuel line section and leads to a drainage point.

For maintaining the fuel supply for the operation of the heat engine, the block valve and control valve are opened, whereas the vent valve remains closed during this phase. The fuel line section between the block valve and the control valve and inside the vent line up to the vent valve form a fuel volume V1. For preventing the supply of fuel and for draining the fuel lines located upstream of the combustion process, the following provisions are made in the chronologically following sequence:

Step 1: The block valve and the control valve are closed, with the vent valve closed;

Step 2: Opening of the vent valve and draining of the fuel volume (V1) which is present in the fuel line section and vent line;

Step 3: Closing of the vent valve;

Step 4: Opening of the control valve;

Step 5: Replenishing of the fuel volume (V1) by means of a pressure-driven backflow of fuel from the combustion process;

Step 6: Closing of the control valve and subsequent opening of the vent valve for draining of the fuel volume (V1) which is replenished according to step 5.

The fuel which is used here can be in liquid or gaseous form, wherein in such a case provision is then also made for a plurality of fuel feed lines for the fuel supply of the combustion process, which typically feature the same valves as described above.

These valves can be operated individually, in combination with each other, consecutively or interdependently of each other.

Another aspect includes that, in the case of an intentionally caused fuel interruption, any uncontrolled combustion or ignition processes, with flashbacks into the fuel line being first and foremost, can be prevented.

The introduction of purging media through the fuel line which leads to the combustion process can therefore be dispensed with.

BRIEF DESCRIPTION OF THE DRAWINGS

All elements which are not essential for the direct understanding of the invention have been omitted. In the drawing, the single FIGURE shows a schematic arrangement of a fuel supply for a heat engine, wherein the fuel supply basically includes at least one fuel which leads to a combustion process and along which at least one valve group is arranged.

DETAILED DESCRIPTION OF EXEMPLARY EMBODIMENTS

In order to supply the combustion process with fuel, provision is made for a fuel line 1 which connects the combustion process 3 to a fuel reservoir 2. A block valve 4 and a control valve 5 are arranged along the fuel line 1.

Furthermore, a vent line 6, along which is arranged a vent valve 7, branches from the fuel line 1 between the block valve 4 and the control valve 5. The vent line 6, downstream of the vent valve 7, leads to a drainage point 8 at which atmospheric ambient pressure conditions customarily prevail.

During normal operation, i.e., in a gas turbine plant in operation, the block valve 4 and control valve 5 are open, whereas the vent valve 7 is closed during this phase. The combustion process 3, via the fuel line 1, is supplied with fuel from the fuel reservoir 2 in a controlled manner by the corresponding valve positioning of the control valve 5, the fuel being adapted at least to the working pressure which prevails inside the combustion process. Customarily, the fuel metering is carried out exclusively via the control valve 5, while the block valve 4 remains completely open in the operating case.

The valve arrangement illustrated in FIG. 1 is typically referred to as a double block and vent valve system since two block valves which block the supply of fuel, specifically the block valve 4 and the control valve 5, are provided, wherein a vent valve 7 is additionally provided.

In the previously current practice for executing a rapid shutdown of the combustion process 3, the supply of fuel is prevented by simultaneous closing of the block valve 4 and control valve 5, as a result of which a proportion of fuel, under working pressure conditions of the combustion process, is trapped inside a line section 1', 6' of the fuel line and vent line, which line section is delimited on one side by the block valve 4, control valve 5 and vent valve 7 which are closed in each case. From this perspective, it can be assumed that this line section traps a fuel volume of V1.

After closing of the block valve 4 and control valve 5 has been carried out, the vent valve 7 is opened, as a result of which the proportion of pressurized fuel inside the fuel volume V1 is drained via the vent line 6 into the region of the drainage point 8. If, for example, the fuel is a gaseous fuel, then this can escape via a type of chimney at a safe place into the open atmosphere.

In this way, a safe disposal of the proportion of fuel inside the line section 1', 6', which delimits the fuel volume V1, is certainly ensured, but a substantial additional volumetric proportion V2 of fuel remains in the fuel line which extends downstream of the control valve 5 and upstream of the combustion process 3. This proportion of residual fuel can lead to unwanted ignition or combustion reactions which can lead to considerable damage, especially in the case of fuel flashbacks along the fuel line. It is now necessary to reliably exclude these uncontrolled combustion events. The current measures for avoiding such uncontrolled combustion events provide purging of the fuel line which leads to the combustion process 3, during which, with the control valve 5 open, purging media, such as $CO_2$, $N_2$, air or the like, is fed via additional purging lines, which are not shown, into the fuel line which leads to the combustion process. However, such purging measures can contribute to further malfunctions of the combustion process, as a result of which at least the proportion of residual fuel in the region of the burner arrangement is caused to combust. Therefore, it is proposed according to principles of the present invention to take the following type of procedure as a basis:

In a first step, the block valve 4 and the control valve 5 are closed, with the vent valve 7 closed.

In a second step, the vent valve 7 is opened so that draining of the fuel volume V1 which is present in the fuel line section 1' and vent line 6' can take place.

In a third step, closing of the vent valve 7 is carried out.

In a fourth step, the control valve 5 is opened.

In a fifth step, replenishing of the fuel volume (V1) is undertaken by a pressure-driven backflow of fuel from the combustion process 3.

In a sixth step, closing of the control valve 5 and subsequent opening of the vent valve 7, for draining of the replenished fuel volume V1 which has been formed there on account of the action taken according to the fifth step, is then carried out.

The following specific itemization for the individual steps are introduced:

According to principles of the present invention, the method is characterized in that, for the purpose of preventing the supply of fuel, the above steps 1-6 are carried out, which steps prevent a flashback in, and/or damage to, the fuel-carrying lines.

From this, it is apparent that similar to the procedure as in the case of the previously explained prior art, in a first step the block valve and control valve are closed, with the vent valve closed in each case.

After closing of the block valve and control valve, fuel, with a fuel volume V1, as already described, is present along the fuel line section which is delimited on both sides by the block valve and control valve and also along the vent line which branches from the fuel line on one side and is delimited by the vent valve 7 on the other side. Furthermore, residual fuel, with a fuel volume V2, is present in the fuel line which leads to the combustion process and is delimited on one side by the control valve 5. The line pressure which prevails both in the fuel volume V1 and also in the fuel volume V2 is identical and corresponds to the fuel line pressure which is required for a reliable operation of the heat engine, especially for fuel feed into the combustion process.

In a second step, the vent valve 7 is opened so that the fuel with the fuel volume V1, against the atmospheric ambient pressure conditions, drains along the vent line 6 to the drainage point 8. After the draining, the pressure which prevails at the drainage point 8, preferably the atmospheric ambient pressure, is established inside the vent line 6 and also inside the fuel line section 1'.

In the ensuing third step, the vent valve 7 is closed and, as the fourth step, the control valve 5 is opened. On account of the different line pressures which prevail between the fuel lines on the left and right of the control valve, a pressure-driven fuel backflow from the fuel line which leads to the combustion process 3 takes place in the direction of the fuel line section 1'. During backflow of the residual fuel, a proportion of hot air from the burner arrangement is additionally drawn in through the fuel line. The control valve 5 remains open until the fuel volume V1 has been filled as a result of the pressure-driven backflow of the residual fuel from the line section which leads from the control valve to the combustion process, with which the replenishing, as the fifth step, is completed.

Subsequent to this, in a sixth step, the control valve 5 is closed. The vent valve 7 can now be opened in order to again drain the fuel volume V1 along the vent line 6 in the direction of the drainage point 8.

The fuel volume V2 which is trapped by the fuel line which leads from the control valve 5 to the combustion process 3 is typically greater, or significantly greater, than the previously referred to fuel volume V1. Therefore, for a complete draining of the remaining proportion of residual fuel along the fuel line which leads to the combustion process 3, it is necessary to repeat the explained backflow process, i.e., to repeat the previously referred to steps two to four times, preferably to repeat the steps n=V2/V1 times.

This means that the control valve 5 is reopened as soon as the vent valve 7 is closed and the pressure conditions which prevail at the drainage point 8 have been established along the fuel line section 1' and 6'. A backflow or back-pumping of the residual fuel, with a proportion of hot air, from the fuel line which leads to the combustion process 3 is carried out again until the fuel volume V1 has been filled again. Draining of the fuel volume V1 is carried out after closing of the control valve 5 by the opening of the vent valve 7.

These measures therefore serve for a controlled backflow or back-pumping of the residual fuel remaining inside the fuel volume V2 after an interruption of the fuel supply. The pumping out process is carried out repetitively until the same pressure conditions are established along the fuel line which leads to the combustion process as at the drainage point 8.

In a preferred embodiment variant of the method, moreover, temperature measuring is undertaken in the region of the control valve in order to ensure that in cases in which hot products of combustion from the combustion process, via the fuel line, propagate in an uncontrolled manner in the direction of the control valve 5, this can be detected immediately in order to interrupt the process of controlled back-pumping of residual fuel. Also, by the temperature monitoring, the proportion by quantity of hot air along the fuel line which leads to the combustion process can be monitored, the proportion of which increases with increasing venting sequence and duration and via the temperature measuring finally leads to stopping of the back-pumping sequence.

The principle of the controlled back-pumping of proportions of residual fuel which are present along the fuel line which leads to the combustion process 3 downstream of the control valve 5 does not require any additional technical components at all, but only a control program which activates the valves in question in the specified manner. Therefore, the measure according to the solution can easily be integrated inexpensively and without technical additional measures both in the case of new plants and in the case of plants which are already in operation. Moreover, methods embodying principles of the present invention can contribute to reducing the operating costs of heat engines, with gas- and steam turbine plants being first and foremost, especially as any purging measures, along with the costs associated therewith, can be dispensed with.

LIST OF DESIGNATIONS

1 Fuel line
1' Fuel line section
2 Fuel reservoir
3 Combustion process, burner
4 Block valve
6 Vent line
6' Vent line section
7 Vent valve
8 Drainage point
V1 Fuel volume
V2 Fuel volume between control valve and combustion process While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

I claim:

1. A method for operating a fuel supply for a heat engine and for preventing the supply of fuel and for draining fuel lines located upstream of the combustion process, wherein the fuel supply includes at least one fuel line which leads to a combustion process and along which at least one valve group is arranged, wherein each valve group includes at least one block valve and at least one control valve, wherein the at least one control valve is arranged closer to the combustion process than the block valve, the block valve and at least one control valve delimit a fuel line section, and a vent line having at least one vent valve which branches from the fuel line section and leads to a drainage point, wherein the fuel line section between the block valve and the at least one control valve and the vent line up to the vent valve form a fuel volume (V1), the method comprising:
   (1) first closing the block valve and the at least one control valve, with the vent valve closed;
   (2) thereafter, opening the vent valve and draining the fuel volume present in the fuel line section and in the vent line;
   (3) thereafter, closing the vent valve;
   (4) thereafter, opening the at least one control valve;
   (5) thereafter, replenishing the fuel volume (V1) by a pressure-driven backflow of fuel from the combustion process; and
   (6) thereafter, closing the control valve and subsequently opening the vent valve for draining of the fuel volume (V1) from said replenishing.

2. The method as claimed in claim 1, further comprising: repeating steps (1) through (6) at least once.

3. The method as claimed in claim 1, further comprising: repeating steps (3) to (6) until a line pressure prevails along the fuel line at least between the closed control valve and the combustion process, as a result of a fuel volume (V2), that is greater than a line pressure along the vent line with the vent valve open.

4. The method as claimed in claim 3, further comprising: repeating steps (3) to (6) n times, wherein n=V2/V1, rounded up to the nearest integer.

5. The method as claimed in claim 1, further comprising:
   measuring a temperature in the region of the control valve; and repeating steps (3) to (6) until a temperature threshold value is not exceeded.

6. The method as claimed in claim 1, wherein a gas and/or steam turbine arrangement comprises the heat engine, and further comprising:
   supplying gaseous or liquid fuel to the heat engine via at least one fuel line.

7. The method as claimed in claim 6, wherein the heat engine comprises a plurality of fuel line runs which are fed with different fuels.

\* \* \* \* \*